(12) United States Patent
Norquist et al.

(10) Patent No.: US 11,511,205 B2
(45) Date of Patent: *Nov. 29, 2022

(54) PLAYGROUND CLIMBING STRUCTURES

(71) Applicant: PlayCore Wisconsin, Inc., Chattanooga, TN (US)

(72) Inventors: Thomas Robert Norquist, Fort Payne, AL (US); Kim Corvin Blackwood, Blountsville, AL (US); Charles Lebron Griffith, IV, Fort Payne, AL (US); Anthony Ryan Parker, Fort Payne, AL (US)

(73) Assignee: PLAYCORE WISCONSIN, INC., Chattanooga, TN (US)

( * ) Notice: Subject to any disclaimer, the term of this patent is extended or adjusted under 35 U.S.C. 154(b) by 83 days.

This patent is subject to a terminal disclaimer.

(21) Appl. No.: 17/152,259

(22) Filed: Jan. 19, 2021

(65) Prior Publication Data

US 2021/0138353 A1 May 13, 2021

Related U.S. Application Data

(63) Continuation of application No. 15/691,365, filed on Aug. 30, 2017, now Pat. No. 10,898,817.

(Continued)

(51) Int. Cl.
*A63G 31/00* (2006.01)
*A63G 21/00* (2006.01)
(Continued)

(52) U.S. Cl.
CPC .............. *A63G 31/00* (2013.01); *A63B 9/00* (2013.01); *A63B 24/0087* (2013.01); *A63B 71/0009* (2013.01); *A63B 71/0622* (2013.01); *A63G 21/00* (2013.01); *A63G 21/10* (2013.01); *G06F 3/0488* (2013.01); *A63B 2009/006* (2013.01); *A63B 2071/0625* (2013.01);
(Continued)

(58) Field of Classification Search
CPC . A63B 9/00; A63B 2009/006; A63B 71/0009; A63G 31/00
See application file for complete search history.

(56) References Cited

U.S. PATENT DOCUMENTS 6,001,020 A 12/1999 Nagelski et al.
6,009,411 A 12/1999 Kepecs
(Continued)

*Primary Examiner* — Jennifer Robertson
(74) *Attorney, Agent, or Firm* — McAndrews, Held & Malloy, Ltd.

(57) ABSTRACT

Embodiments of the present disclosure are directed to playground climbing structures that provide a pathway defined by a lower surface and bound on each side by a sidewall. The structures may comprise sensory play activities on the interior of the sidewalls as well as on the exterior of the sidewalls. The climbing structure is also adapted so as to be accessible to children of varying physical abilities, including for instance children with disabilities, such as by having at least one platform configured for access from a wheelchair or other mobility device and incremental adjustments in elevation that may be navigated by a child with limited mobility. Embodiments of the climbing structures are assembled from a plurality of components, which can be connected together in a variety of configurations to provide custom modular structures.

18 Claims, 11 Drawing Sheets

Related U.S. Application Data

(60) Provisional application No. 62/404,629, filed on Oct. 5, 2016.

(51) Int. Cl.
    *A63B 71/00*     (2006.01)
    *A63B 9/00*     (2006.01)
    *A63B 24/00*     (2006.01)
    *A63B 71/06*     (2006.01)
    *A63G 21/10*     (2006.01)
    *G06F 3/0488*     (2022.01)

(52) U.S. Cl.
    CPC ... *A63B 2071/0655* (2013.01); *A63B 2208/12* (2013.01); *A63B 2220/801* (2013.01); *A63B 2220/803* (2013.01); *A63B 2225/09* (2013.01); *A63B 2225/50* (2013.01)

(56) References Cited

U.S. PATENT DOCUMENTS

| | | | |
|---|---|---|---|
| 6,099,411 A * | 8/2000 | Van Wagenen | A63B 9/00 |
| | | | 472/136 |
| 6,108,988 A | 8/2000 | Nagelski et al. | |
| 6,419,587 B1 | 7/2002 | Geyer | |
| D468,386 S | 1/2003 | Frank | |
| D514,653 S | 2/2006 | Auberger | |
| 9,517,419 B1 | 12/2016 | Lee et al. | |
| 10,898,817 B2 * | 1/2021 | Norquist | A63B 71/0009 |
| 2009/0197740 A1 | 8/2009 | Julskjaer et al. | |
| 2011/0086717 A1 | 4/2011 | Connors et al. | |
| 2012/0142441 A1 | 6/2012 | King et al. | |
| 2017/0266571 A1 * | 9/2017 | Goto | A63G 21/02 |

* cited by examiner

PLAYGROUND CLIMBING STRUCTURES

This application is a continuation of U.S. Non-Provisional patent application Ser. No. 15/691,365, filed on Aug. 30, 2017, which claims priority to U.S. Provisional Patent Application No. 62/404,629, filed on Oct. 5, 2016, the entireties of which are incorporated by reference herein.

BACKGROUND OF THE INVENTION

Public playgrounds often include structures that are designed to provide children with a variety of different play activities. Many public playgrounds include one or more elevated composite playground systems, with the elevated composite playground system typically having slides and climbing elements connected to an elevated deck, or platform. Many public playgrounds also include stand-alone structures, such as swing-sets, merry-go-rounds, see-saws, or the like. The components described herein may be used to create a variety of new playground climbing structures, each of which may be configured to provide children with an enhanced climbing experience. Depending on the configuration of the components, these new playground climbing structures may either be connected to the deck of an elevated composite playground system or they may be stand-alone structures.

SUMMARY OF THE INVENTION

Embodiments of the present disclosure are directed to playground structures that are configured for a child to climb on. The playground structures comprise a lower surface that spans between at least a first end and a second end. At least a portion of the lower surface comprises incremental adjustments in elevation, upon which a child may climb upward or downward. The lower surface is bound on each side by a sidewall. The structure is thereby configured for a child to climb on the lower surface of the structure and maneuver between the two sidewalls.

Embodiments of the playground structures provide children with an enhanced climbing experience. For instance, in some embodiments the playground climbing structure comprises interactive play stations on at least one of the sidewalls. The interactive play stations offer sensory-stimulating play activities, which may be selected to produce a climbing structure that provides a new combination of play experiences. The interactive play stations may comprise a number of play panels, which are each attached to a sidewall of the structure. The play panels may be selected to provide a variety of sensory play activities, including for example auditory play activities, visual play activities, tactile play activities, and the like. Additionally, each play panel may be removable from the structure, so that play panels can be swapped out or replaced to provide different play experiences.

The playground climbing structure may comprise interactive play stations, such as the play panels described above, on an interior surface of a sidewall. As a child maneuvers through and over the climbing structure, the child will therefore come upon these interactive play stations. The playground climbing structure may also comprise interactive play stations, such as the play panels described above, on an exterior surface of a sidewall. In this way, the climbing structure may provide a child with play activities around the periphery of the structure in addition to providing the climbing activity. In some embodiments, the playground climbing structure may comprise interactive play stations, such as play panels, on both the interior surfaces and the exterior surfaces of the sidewalls.

Embodiments of the playground structures may also provide children with an enhanced climbing experience by providing a climbing experience that may be enjoyed by children of limited physical abilities, such as children with disabilities. For instance, in some embodiments the playground climbing structure may comprise a platform that is configured for a child on a mobility-enhancing device such as a wheelchair to access the structure. The platform comprises a substantially flat surface having a width of at least 24 inches and extending from a free distal end a length of at least 14 inches. The platform may also comprise at least one handhold, or more desirably at least a pair of handholds, at the free end, the platform being configured for a child on a wheelchair to grip the one or more handholds in order to pull oneself up from the wheelchair and onto the platform. The platform is desirably located at a height between about 11 and about 18 inches from the play surface, e.g. the ground.

The playground climbing structure may comprise a platform such as that described above on an end of the structure. For instance, the playground climbing structure may comprise a platform on the first end of the structure, the second end of the structure, or both. The playground structure may also comprise a platform at an intermediate position along the structure. For instance, the platform may extend outward from a gap in a sidewall. In some embodiments, the playground climbing structure may include a platform at an end of the structure as well as a platform at an intermediate position along the structure.

Embodiments of the playground structures may also provide children with an enhanced climbing experience by providing a structure that is shaped to provide increased enjoyment, such as by comprising curved and/or rounded features that are easy and enjoyable for a child to navigate. For instance, the lower surface may transition into the sidewalls through a curved transitional region. Moreover, each of the incremental adjustments in elevation may comprise a curved surface that extends between one elevation and the next. By providing substantially smooth incremental adjustments of this sort, children of limited abilities may easily scoot up and down the lower surface. The lower surface may also comprise spaces between the incremental adjustments in elevation that are configured for a child to be able to comfortably rest before moving on to the next incremental adjustment. The playground structure may also comprise one or more handholds located on the lower surface and/or on the interior surfaces of the sidewalls. The handholds may provide assistance for a child, such as a child having a disability, to navigate the climbing structure.

The sidewalls may also comprise rounded and/or curved surfaces. For example, the upper edge of each sidewall may have a waved form, in which the sidewall extends into rounded or semi-rounded peaks and dips into rounded or semi-rounded valleys. The upper edge of each sidewall may also be configured for use as a handgrip by a child as the child maneuvers along the climbing structure. The peaks and valleys provide increased opportunities for children on the climbing structure to interact and play with children and/or caretakers that are outside of the climbing structure, e.g. around the periphery of the structure. The peaks also provide surfaces that can be used for the positioning of interactive play stations—such as on the interior of the sidewall, the exterior of the sidewall, or both. The valleys may also allow a child to interact with a play station located on the exterior of the sidewall while on the climbing structure.

The playground climbing structure may also comprise rounded portions that extend inward from the sidewalls so as to provide an obstruction to movement between the sidewalls. For instance, the extending portions may provide a narrowed passageway through which a child must navigate. In some embodiments, these extending portions may also comprise one or more handholds. These obstructions provide a child with a more varied climbing experience, which may increase enjoyment of the climbing structure.

The lower surface of the playground climbing structure may also comprise components that provide tactile play activities for a child as the child navigates the climbing structure. For instance, the lower surface may comprise a winding groove, which may resemble a flowing body of water such as a stream or a river. Indeed, this winding groove may also provide enhanced drainage during rainy weather, wherein water collecting in the structure will flow into the groove and out of the structure. The lower surface may also comprise a plurality of bumps and/or indentations, which provide additional tactile play elements. The playground structure may be assembled from a plurality of modular components, with the components being connected together to provide a substantially continuous lower surface between at least the first end and the second end. The structure may comprise a combination of one or more of each of the following components: arch component, straight component, curve component, end transfer platform component, and deck coupler component. By selecting a desired combination of modular components, playground climbing structures of varying shapes and sizes can be prepared. For instance, the playground structure may be configured to provide a stand-alone playground unit or the playground structure may be configured to be connected to a deck of an elevated composite playground system.

Embodiments of the present disclosure are also directed to a climbing system comprising the modular components that may be connected together in a variety of configurations to provide the playground climbing structures described herein.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

Figure 1:
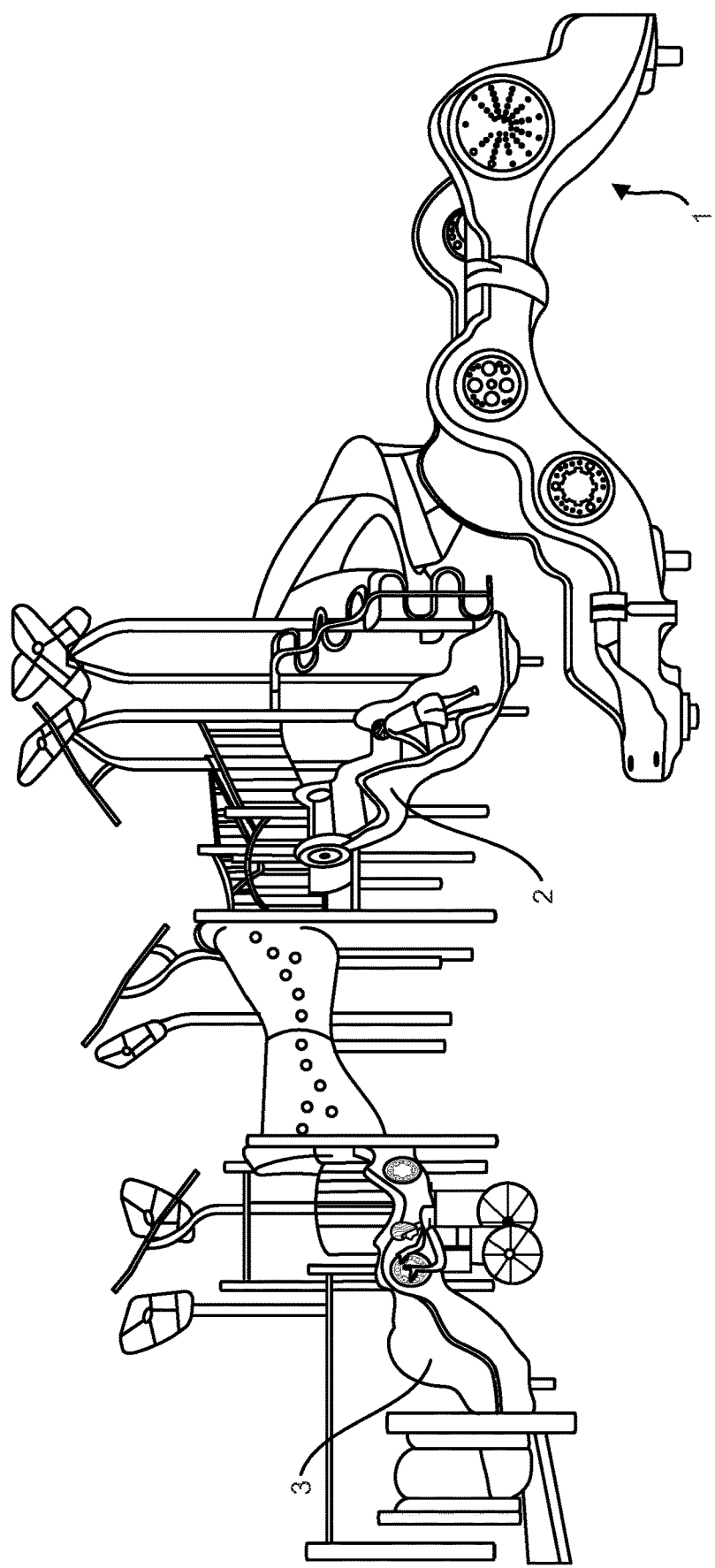
FIG. 1 is a view of a playground containing embodiments of the climbing structures of the present disclosure.

Embodiments of the present disclosure are directed to playground structures 10 that are configured for children to climb along one or more navigable pathways created by the structure. As shown in FIG. 1, these structures 10 may be stand-alone units, for example structure 1, or they may be coupled to other play structures such as an elevated play structure, for example structure 2, which provides access from a ground-level play surface to an elevated composite playground system, and structure 3, which provides access between two elevated play levels.

The playground structures 10 may comprise a lower surface 11, a first sidewall 12, and a second sidewall 13. The lower surface 11 spans between the first sidewall 12 and the second sidewall 13 such that a navigable pathway (also referred to herein as a passageway) over the lower surface is formed between the two sidewalls. This navigable pathway extends between at least a first end 14 and a second end 114. In some embodiments, the climbing unit may also comprise additional pathways that intersect the pathway extending between the first end 14 and the second end 114.

The width of the passageway between the first and second sidewalls 12, 13 may vary. In some embodiments, the distance between the inner surface of the first sidewall 12 and the inner surface of the second sidewall 13 may generally fall within the range between about 18 inches and about 36 inches, alternatively between about 20 inches and about 36 inches, alternatively between about 22 inches and about 34 inches, alternatively between about 24 inches and about 36 inches, alternatively between about 24 inches and about 32 inches, alternatively between about 24 inches and about 30 inches, alternatively between about 24 inches and about 28 inches. The length of the passageway between the first end 14 and the second end 114 may depend on the particular arrangement of components that make up the playground structure 10.

The lower surface 11 may be integral with the first and second sidewalls 12, 13. For instance, in some embodiments, at least a portion of the lower surface 11 may curve upward into each of the first and second sidewalls 12, 13, providing a structure 10 having a generally U-shaped cross-section. As such, the structure 10 may eliminate or reduce corners and sharp angles, increasing safety as well as enhancing the play experience by providing interesting and stimulating contours. The contours also may provide support that children, including children having disabilities, may use to rest or support themselves while navigating the climbing structure. In some embodiments, the angle of curvature of the transition between the lower surface 11 and the sidewalls 12, 13 may vary at different portions of the climbing structure 10.

The playground structure 10 is configured to provide children with a unique and enjoyable climbing experience. For instance, at least a portion of the lower surface 11 may comprise a series of incremental adjustments in elevation 15. The incremental adjustments in elevation 15 may be specially engineered to provide a climbing experience that is accessible to children of varying physical abilities.

For instance, rather than stairs, which are designed for a user to step from one elevation to the next, the incremental adjustments in elevation 15 may be designed so that children are able to navigate the incremental adjustments in different ways, such as climbing, crawling, or scooting. In this way, the climbing structure 10 may provide a climbing experience that is accessible to children of varying physical abilities, including for instance children with disabilities. By promoting different ways of navigation, the incremental adjustments in elevation 15 also provide a more interesting, and thus enjoyable, climbing experience.

In some embodiments, for example, one or more of the incremental adjustments in elevation 15 may be spaced apart from one another by a distance (e.g. greater than 1 foot, alternatively greater than 1.5 feet, alternatively greater than 2 feet, alternatively greater than 2.5 feet, at least 3 feet) that is too big for a child to simply step from one elevation to the next. In addition to promoting alternative methods of navigation, larger distances between adjacent adjustments in elevation 15 (e.g., between 1 foot and 4 feet, alternatively between 1.5 feet and 3.5 feet, alternatively between 1.5 feet and 3 feet) may also provide space for a child to sit on a substantially flat surface between adjacent adjustments. In addition to allowing for the inclusion of play opportunities along the incremental adjustments 15, these flat surfaces also provide space for a child to rest during navigation from one elevation to the next, which render the climbing structure 10 suitable for children with disabilities. In some embodiments, the distance between adjacent adjustments in elevation 15 may vary, such that the distance between a first adjustment and a second adjustment may be significantly different from the distance between the second adjustment and a third adjustment. By comprising fluctuating distances between adjustments, the climbing structure 10 may provide a more varied, and thus more interesting, climbing experience.

Figure 2:
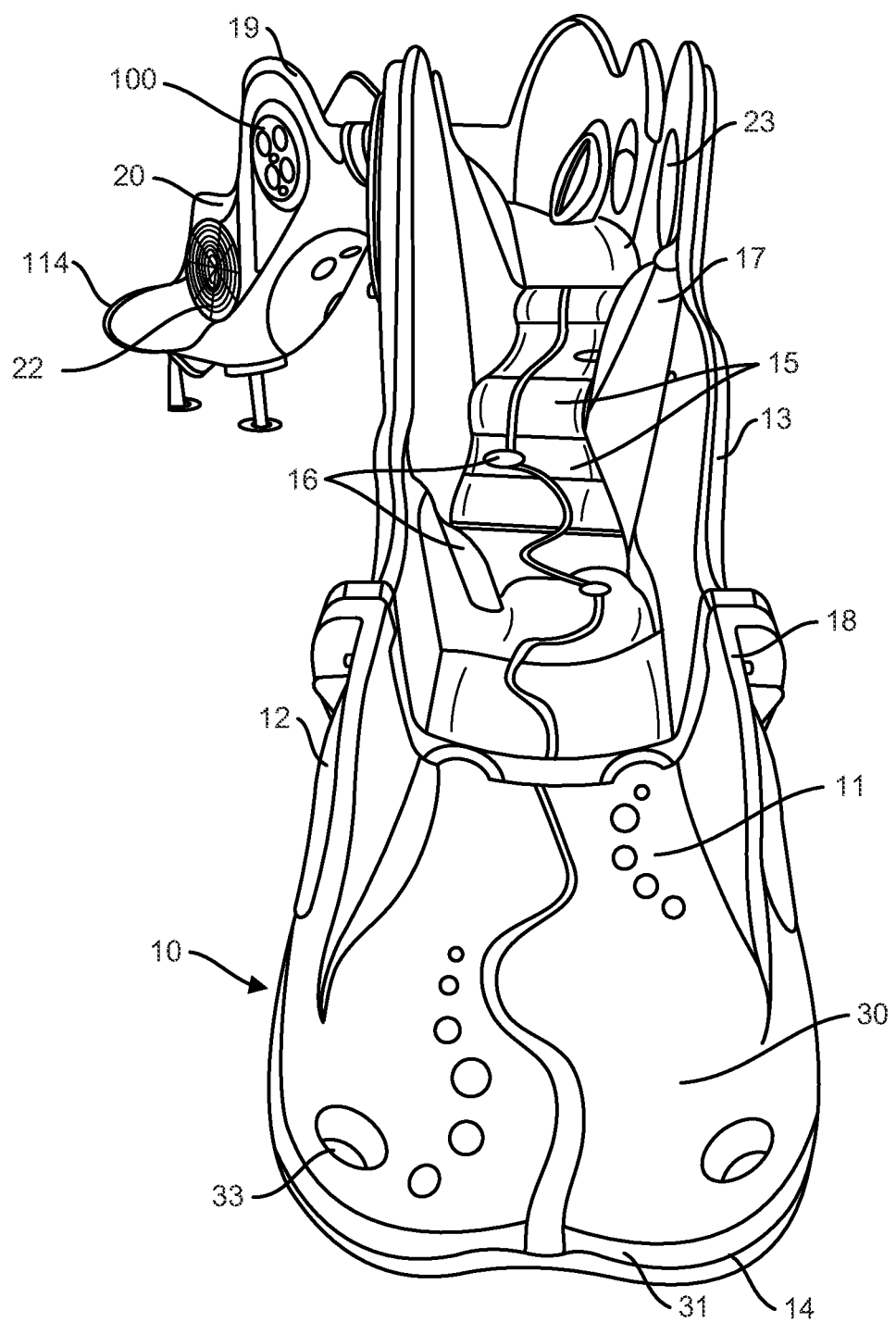
FIG. 2 is a front perspective view of an embodiment of a climbing structure.

In some embodiments, the incremental adjustments in elevation 15 may also be configured so that a child may easily and enjoyably crawl or scoot, i.e. move while in a generally sitting position, from one elevation to the next. For instance, as shown in FIG. 2, each of the incremental adjustments in elevation 15 may comprise a substantially continuous curve of the lower surface from one elevation to the next. By providing a curved adjustment in elevation, corners and sharp angles are reduced or eliminated. Not only does this increase safety, it allows for and promotes different ways of navigation, such as crawling and scooting, and renders the climbing experience more enjoyable. To allow for navigation by crawling or scooting, the height of each adjustment in elevation 15 may also be relatively low, so that a child with a disability is easily able to scoot from one elevation to the next. For example, the height of each adjustment in elevation may be less than 1.5 feet, alternatively less than 1 foot. The series of incremental adjustments in elevation 15 may also comprise varying heights. For instance, a first adjustment in elevation may have a first height and a second adjustment in elevation may have a second height, wherein the first height and the second height differ significantly from one another. By comprising elevation adjustments 15 with fluctuating heights, the climbing structure 10 may provide a more varied, and thus more interesting, climbing experience.

In some embodiments, the lower surface 11 may also comprise one or more handholds 16. As shown in FIG. 2, one or more of the handholds 16 may be located at or near the incremental adjustments in elevation 15. In this way, the handholds 16 may provide assistance for a child to navigate from one elevation to the next. The handholds 16 may comprise one or more protruding elements, one or more cutaway elements, or a combination thereof. For instance, one or more of the handholds 16 may comprise an element that protrudes generally upward from the lower surface 11. One or more of the handholds 16 may comprise an element that protrudes generally inward from one of the first and second sidewalls 12, 13. One or more of the handholds 16 may comprise an aperture extending through a portion of the lower surface 11, extending through one of the first and second sidewalls 12, 13, or a combination thereof. Notably, one or more of the handholds 16 may also be utilized as footholds during different manners of navigation and during play with any of the play elements associated with the climbing structure 10.

In some embodiments, the climbing structure 10 may also comprise one or more portions 17 that extend inward from one of the first and second sidewalls 12, 13, i.e. into the navigable pathway between the first and second sidewalls. These inward projections 17 serve to obstruct straightforward navigation of the pathway, such as by providing narrowed areas that must be navigated around by children. By providing obstructions of this sort, children may be required to navigating a winding or snaking pathway within at least a portion of the climbing structure 10, even where the first and second sidewalls 12, 13 are substantially straight.

In some embodiments, each of the first and second sidewalls 12, 13 may have a contoured, or wavy, upper edge 18. For instance, as shown in FIG. 2, the upper edge 18 of the first and second sidewalls 12, 13 may comprise a series of alternating peaks 19 and valleys 20. The wavy contour of the upper edges 18 of the sidewalls increases the interest level and enjoyment of the climbing structure 10. The peaks 19 and valleys 20 also provide an array of opportunities for children on the climbing structure 10, i.e. within the passageway, to interact and play with children and/or caretakers located outside of the climbing structure, such as on either side of the climbing structure. The peaks 19 may also provide adequate surface area for the incorporation of play panels 100, both on the interior and on the exterior of the sidewalls 12, 13, as described in more detail herein. Valleys 20 located adjacent to play panels 100 that are positioned on the exterior of one of the sidewalls 12, 13 may ensure that a child on and within the climbing structure 10 can safely utilize and interact with the play panel, either alone or socially with children and/or caretakers located outside of the climbing structure.

In some embodiments, the sidewalls 12, 13 may also comprise one or more windows 23, which provide additional opportunities for interactive play between children on the climbing structure 10, i.e. within the passageway, and children/caretakers outside of the structure. The windows 23 may comprise openings molded directly into the sidewall. In some embodiments, the windows may also be configured for the insertion of play panels 100, as described in more detail herein. In the illustrated embodiments, the windows 23 are circular, although other shapes and sizes are also contemplated without departing from the scope of the present disclosure. In some instances, the windows may be openings in the sidewall whereas in other instances the windows may also comprise a transparent or semi-transparent insert. For example, one or more of the windows may comprise a colored and/or textured insert.

In some embodiments, the upper edge 18 of the first and second sidewalls 12, 13 may also be configured for use as a handrail. For instance, the upper edge 18 of the sidewalls 12, 13 may be rounded and may have a width between about one inch and about three inches, alternatively between about one inch and about 2.5 inches, alternatively between about one inch and about two inches. The handrail at the upper edge 18 of the first and second sidewalls may provide increased safety as well as increased enjoyment of the climbing structure 10. This may particularly be true where the upper edge 18 of the first and second sidewalls 12, 13 is contoured so as to comprise peaks 19 and valleys 20 as shown in the illustrated embodiments. In this embodiment, for instance, use of the handrail at the upper edge 18 of the sidewalls 12, 13 during navigation of the passageway may provide a tactile play element.

In some embodiments, the lower surface 11 and/or the interior surfaces of the first and second sidewalls 12, 13 may comprise tactile play elements. These tactile play elements may be molded directly into the interior surfaces of the climbing structure. As shown in the embodiment illustrated in FIG. 2, for example, the lower surface 11 may comprise bumps, indentations, or a combination thereof. In some embodiments, the lower surface 11 may comprise a groove 21 that runs along at least a portion of the lower surface. As illustrated in FIG. 2, the groove 21 may take a winding route along a length of the lower surface 11. In addition to providing a tactile play element, the groove 21 may serve to assist with the draining of water from the structure 10, such as during periods of rainfall.

In some embodiments, elements of the play structure 10 either alone or in combination may call to mind formations found in nature. An example of this can be seen in FIG. 2. For example, the winding groove 21 may resemble a stream or river, the inward projections 17 may resemble boulders, the handholds 16 may resemble rocks, the peaks 19 and valleys 20 of the sidewalls may resemble waves or rolling hills or mountains. Any combination of these features may increase the enjoyability of the climbing structure 10 by reflecting or imitating a natural play environment.

Modular Component Assembly

Embodiments of the playground structure 10 may be constructed from a plurality of independent, modular components. The components may be configured so that they may easily be connected together to provide a substantially continuous lower surface 11 between the first end 14 and the second end 114 of the structure. The components may be selected from the following: an arch component 41, a curve component 42, a deck coupler component 43, an end transfer platform component 44, and a straight component 45. By selecting a desired number and configuration of these components, one may be able to assemble a virtually unlimited number of different climbing structures 10.

For instance, the standalone structure 1 in FIG. 1 is assembled from a first end transfer platform component 44 connected to a first arch component 41, which is connected to a second arch component (such that the top of the first arch component and the top of the second arch component are aligned), which is connected to a second end transfer platform component. Structure 2 is assembled from an end transfer platform component 44 connected to a first arch component 41, which is connected to a second arch component (such that the top of the first arch component is aligned with the bottom of the second arch component), which is connected to a deck coupler component 43, the deck coupler component being coupled to the deck of an elevated composite playground system. Structure 3 is assembled from a first deck coupler component 43 connected to an arch component 41, which is connected to a curve component 42, which is connected to a second deck coupler component 43, the deck coupler component being coupled to the deck of an elevated composite playground system.

Figure 3:
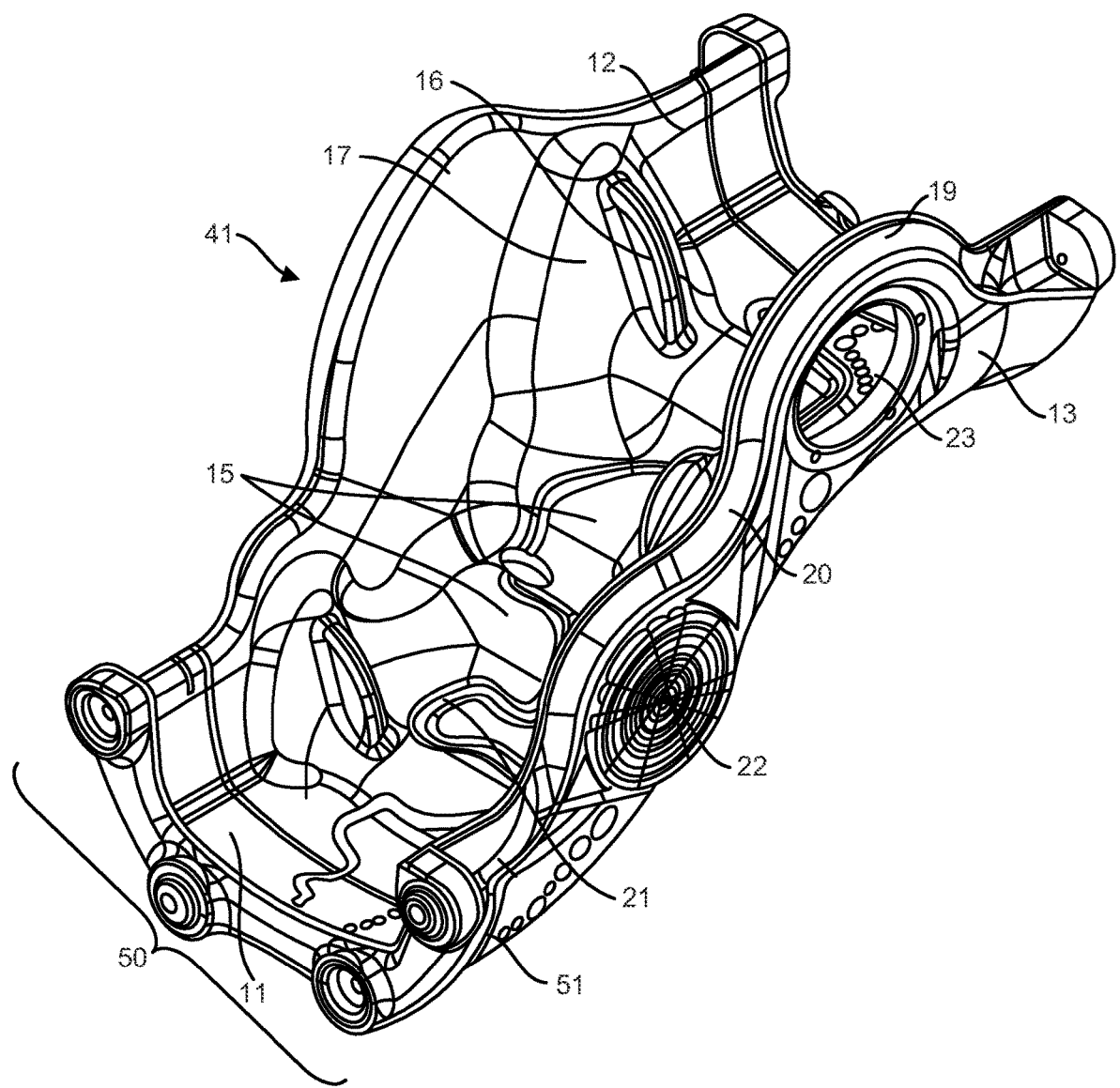
FIG. 3 is a perspective view of an embodiment of an arch component, such as may form a portion of the climbing structures of the present disclosure.

An arch component 41 is a component that comprises a series of incremental adjustments in elevation 15, such that a child may climb from a first elevation (e.g. at the bottom of the arch component) to a second elevation (e.g. at the top of the arch component). The arch component 41 may be configured to attachment to other components 42, 43, 44, 45 at each end. An example of an arch component 41 is shown in FIG. 3. The embodiment shown in FIG. 3 is not meant to be limiting. For example, the change in elevation may vary from that shown in the exemplary embodiment, as may the inclusion, number, and/or placement of various features described herein, including for example incremental adjustments 15, handgrips 16, inward projections 17, sidewall peaks 19 and valleys 20, tactile floor features 21, integral play stations 22, windows 23, surfaces 26 designed for the mounting of play panels 100, openings 24 for floor play elements 25, etc.

Figure 4:
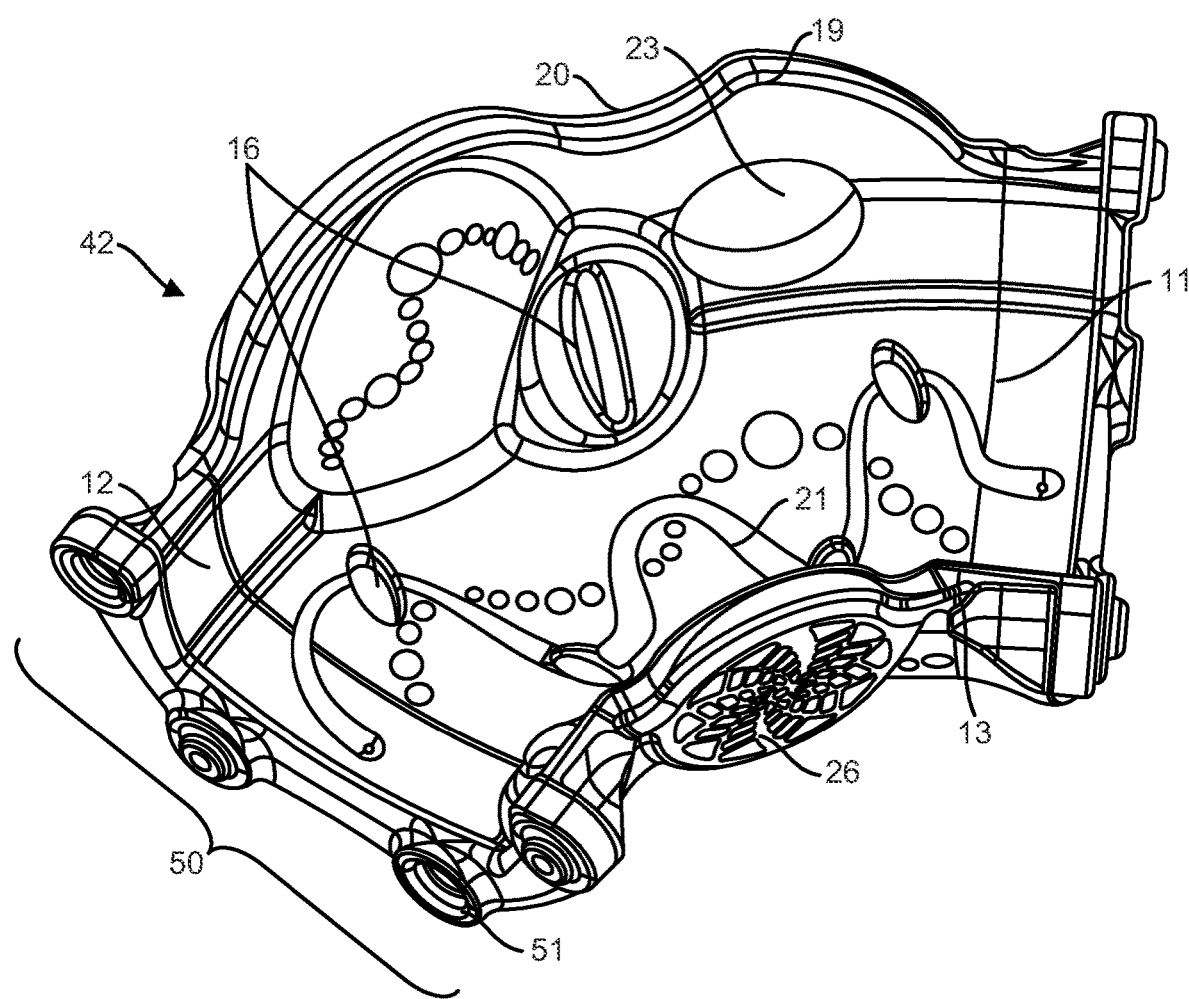
FIG. 4 is a perspective view of an embodiment of a curve component, such as may form a portion of the climbing structures of the present disclosure.

A curve component 42 is a component that comprises a curved, or angled, passageway. Preferably, each of the lower surface 11 and the first and second sidewalls 12, 13 may be curved. Alternatively, one or more of the lower surface 11 and the first and second sidewalls 12, 13 may be angled, although sharp angles and corners are generally disfavored. By including one or more curve components 42 in a playground climbing structure 10, one may assemble structures that comprise a non-straight passageway between the first end 14 and the second end 114. Each end of the curve component 42 may be configured to attachment to other components 41, 43, 44, 45. An example of a curve component 42 is shown in FIG. 4. The embodiment shown in FIG. 4 is not meant to be limiting. For example, the degree of curvature may vary from that shown in the exemplary embodiment, as may the inclusion, number, and/or placement of various features described herein, including for example handgrips 16, inward projections 17, sidewall peaks 19 and valleys 20, tactile floor features 21, integral play stations 22, windows 23, surfaces 26 designed for the mounting of play panels 100, openings 24 for floor play elements 25, etc.

Figure 5:
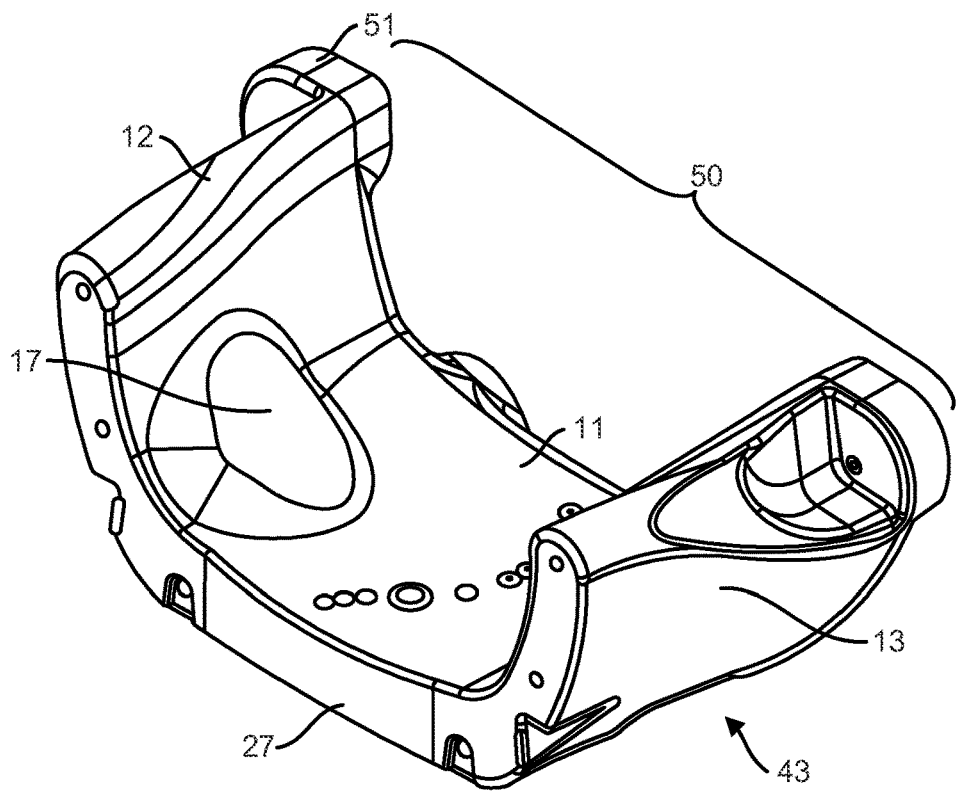
FIG. 5 is a perspective view of an embodiment of a deck coupler component, such as may form a portion of the climbing structures of the present disclosure.

A deck coupler component 43 is a component that comprises an end 27 that is designed for coupling the climbing structure 10 to the deck of an elevated composite playground system, such as through any known or conventional manner. The other end of the deck coupler component 43 is configured for attachment to the other components 41, 42, 44, 45. An example of a deck coupler component 43 is shown in FIG. 5. The embodiment shown in FIG. 5 is not meant to be limiting. For example, any component 41, 42, 44, 45 can be converted to a deck coupler component 43 by providing end 27 designed for coupling to a deck of an elevated composite playground system. For purposes of efficient manufacturing, however, it may be desirable to provide a relatively short, straight deck coupler component 43, such as the embodiment shown in FIG. 5, which can be attached to any other component 41, 42, 44, 45 for coupling of an end 14, 114 of the climbing structure 10 to a deck of an elevated composite playground system. The length of the deck coupler component 43 may vary from that shown in the exemplary embodiment, as may the inclusion, number, and/or placement of various features described herein, including for example handgrips 16, inward projections 17, sidewall peaks 19 and valleys 20, tactile floor features 21, integral play stations 22, windows 23, surfaces 26 designed for the mounting of play panels 100, openings 24 for floor play elements 25, etc.

Figure 6:
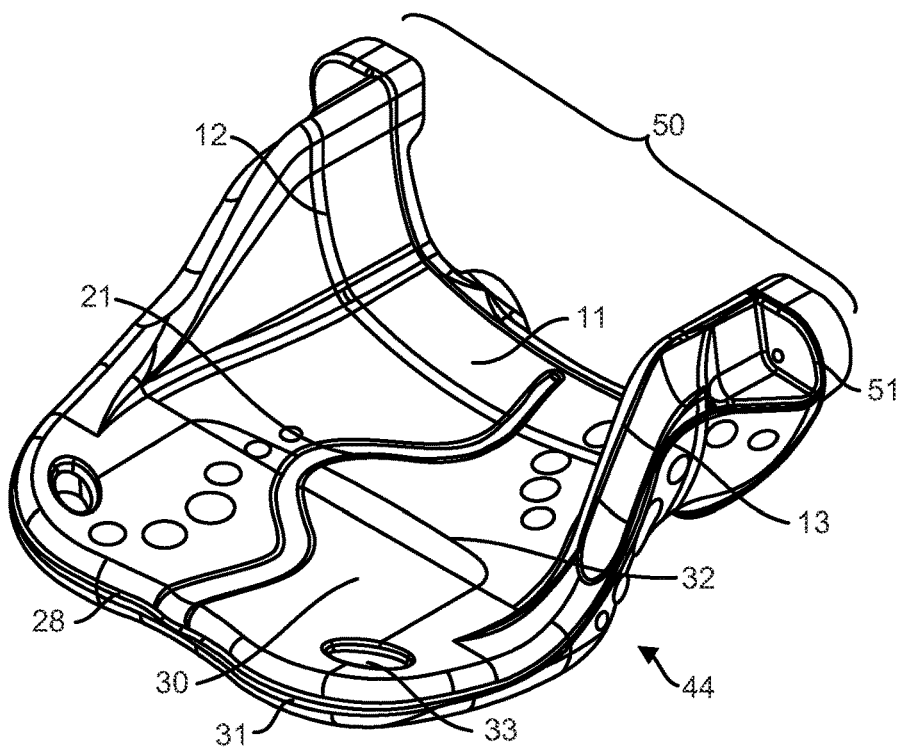
FIG. 6 is a perspective view of an embodiment of an end transfer platform component, such as may form a portion of the climbing structures of the present disclosure.

An end transfer platform component 44 is a component that comprises an end 28 that is configured for children to access the passageway defined by the lower surface 11 and the first and second sidewalls 12, 13 from a play surface, e.g. the ground. For instance, end 28 may comprise a platform, for example an access platform 30 that is configured so that a child with a disability may access the structure, as described in detail herein. The other end of the end transfer platform component 44 is configured for attachment to the other components 41, 42, 43, 45. An example of an end transfer platform component 44 is shown in FIG. 6. The embodiment shown in FIG. 6 is not meant to be limiting. For example, any component 41, 42, 43, 45 can be converted to an end transfer platform component 44 by providing end 28 designed for children to access the climbing structure 10 from a play surface. For purposes of efficient manufacturing, however, it may be desirable to provide a relatively short, straight end transfer platform component 44, such as the embodiment shown in FIG. 5, which can be attached to any other component 41, 42, 43, 45 for providing an end 14, 114 of the climbing structure 10 that is accessible from a play surface. The length of the end transfer platform component 44 may vary from that shown in the exemplary embodiment, as may the inclusion, number, and/or placement of various features described herein, including for example handgrips 16, inward projections 17, sidewall peaks 19 and valleys 20, tactile floor features 21, integral play stations 22, windows 23, surfaces 26 designed for the mounting of play panels 100, openings 24 for floor play elements 25, etc.

Figure 7:
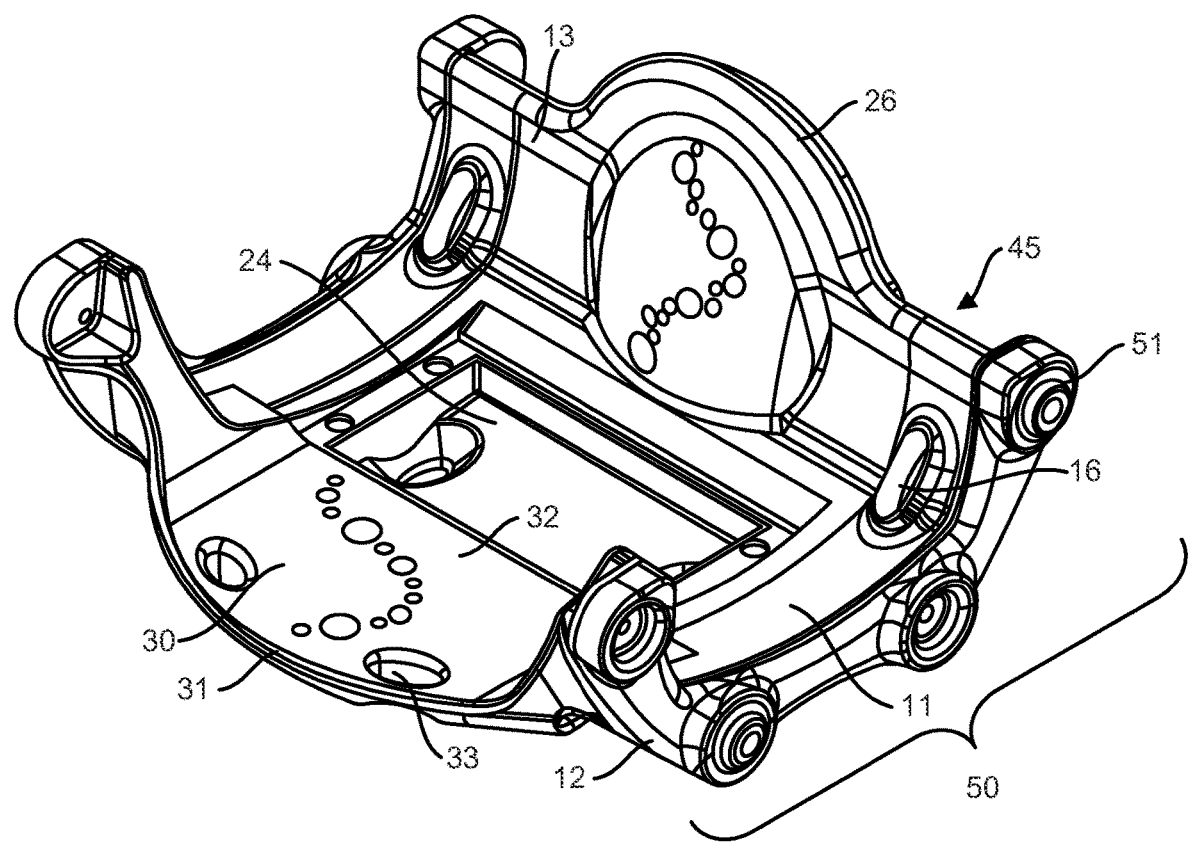
FIG. 7 is a perspective view of an embodiment of a straight transfer component, such as may form a portion of the climbing structures of the present disclosure.

A straight component 45 is a component that comprises a straight passageway. Each end of the straight component 45 may be configured for attachment to other components 41, 42, 43, 44. By including one or more straight components 45 in a playground climbing structure 10, one may extend the length of the passageway between the first end 14 and the second end 114. Straight components 45 may also be designed to provide one or more additional features, if desired. An example of a straight component 45 that is designed to provide a number of additional features is shown in FIG. 7. The illustrated straight component 45 comprises an opening 24 designed for the insertion of a floor play element 25 as well as a side-access platform 30 by which a child may access the passageway through a gap in one of the sidewalls 12, 13 of the structure 10. As illustrated, the side-access platform 30 is configured so that a child with a disability may access the structure, as described in detail herein. In other embodiments, however, the side-access platform 30 need not be so designed. The embodiment shown in FIG. 7 is not meant to be limiting. For example, a straight component 45 may not comprise an opening 24 for a floor play element 25 and/or a side-access platform 30, each of which is present in the embodiment shown in FIG. 7. Moreover, the inclusion, number, and/or placement of various features described herein, including for example handgrips 16, inward projections 17, sidewall peaks 19 and valleys 20, tactile floor features 21, integral play stations 22, windows 23, surfaces 26 designed for the mounting of play panels 100, openings 24 for floor play elements 25, etc., may vary.

At least one end, and in many instances both ends, of the components 41, 42, 43, 44, 45 may comprise a mating system 50 that allows each component to be attached end-to-end to any other component. Where each component 41, 42, 43, 44, and 45 comprises a standardized mating system 50, the components may be modularly assembled in any of a number of configurations to provide unique playground climbing structures 10 that can be custom designed for a particular playground space.

The mating system 50 may comprise a plurality of mating elements 51 that are configured to connect with a plurality of mating elements on each of the other components. In some embodiments, each mating element 51 may comprise one or more male mating elements, one or more female mating elements, or a combination thereof. Each of the mating elements 51 may also comprise one or more through-holes, which are sized to accommodate a conventional fastener, such as a bolt, screw, or the like, and are positioned so as to align with one or more through-holes on a corresponding mating element of each other component. In this way, corresponding mating elements 51 of adjacent components 41, 42, 43, 44, 45 can be connected together using the male/female elements and then secured by attachment of one or more fasteners through the one or more through-holes. In some embodiments, such as that illustrated in the Figures, the mating elements 51 may comprise a surface that is substantially perpendicular to the lower surface 11 or sidewall 12, 13 from which it extends. This surface provides easy access to the one or more through-holes so that the one or more fasteners can easily be attached to connected mating elements 51 during assembly of adjacent components 41, 42, 43, 44, 45. By providing a mating system 50 of this sort, a climbing structure 10 may be easily assembled and the risk of assembly errors may be minimized or eliminated.

In the illustrated embodiment, each component 41, 42, 43, 44, 45 comprises four mating elements 51 on at least one end of the component. Specifically, an end of the component 41, 42, 43, 44, 45 comprises a first mating element 51 at the upper portion of the first sidewall 12, a second mating element at the upper portion of the second sidewall 13, a third mating element at the transition between the first sidewall and the lower surface 11, and a fourth mating element at the transition between the second sidewall and the lower surface. The embodiment shown in the illustrated embodiment is not meant to be limiting however. Rather, the number of mating elements 51 and/or the positioning of the mating elements 51 on each of the components 41, 42, 43, 44, 45 may vary. That said, it has been found that the illustrated arrangement of mating elements 51 provides a secure connection between modular components 41, 42, 43, 44, 45.

In the illustrated embodiment, the mating systems 50 on a first end of each of components 41, 42, and 45 are substantially identical with one another. For example, the first mating element 51 (i.e. the mating element at the top of a first sidewall 12) may comprise a male connection element and the second mating element (i.e. the mating element at the top of a second sidewall 13) may comprise a female connection element. Similarly, the third mating element 51 (i.e. the mating element at the transition between the first sidewall 12 and the lower surface 11) may comprise a female mating element and the fourth mating element (i.e. the mating element at the transition between the second sidewall 13 and the lower surface) may comprise a male mating element.

The mating systems 50 on a second end of each of components 41, 42, and 45 are also substantially identical with one another. Moreover, the mating system 50 on a second end of each of components 41, 42, and 45 have male and female connection elements arranged in an opposite manner to that of the first end of the component. In the illustrated embodiment, for example, the first mating element 51 (i.e. the mating element at the top of a first sidewall 12) may comprise a female connection element and the second mating element (i.e. the mating element at the top of a second sidewall 13) may comprise a male connection element. Similarly, the third mating element 51 (i.e. the mating element at the transition between the first sidewall 12 and the lower surface 11) may comprise a male mating element and the fourth mating element (i.e. the mating element at the transition between the second sidewall 13 and the lower surface) may comprise a female mating element. In this way, the mating elements 51 located at opposite ends of each component 41, 42, 45, and having the same position along the cross section of the component, have opposite connection elements, i.e. one of the mating elements comprises a male connection element and the other mating element comprises a female connection element.

Arrangement of the mating elements 51 in this manner allows for the attachment of elements 41, 42, and 45 to one another in a maximum variety of arrangements. For example, one may connect the high elevation end of a first arch component 41 with either the low elevation end of a second arch component or the high elevation end of a second arch component. Similarly, one may connect either end of a straight component 45 with either end of a curve component 42, such that the curve component 42 may curve in either of two different directions. The mating system 50 of components 43 and 44 (which is only present on one end of the component) are substantially identical to that present on either the first end or the second end of components 41, 42, 45. This provides that components 43, 44 may also be connected with either end of components 41, 42, and 45.

The illustrated arrangement of mating elements 51 provides components 41, 42, 43, 44, 45 that can be assembled in the maximum number of configurations. However, it will also be apparent from the present disclosure that this type of uniform mating system 50 is not depending on the number of mating elements 51 present or the positioning of the mating elements along the cross-section of the components 41, 42, 43, 44, 45. For example, a uniform mating system 50 could similarly comprise only a pair of mating elements located along the lower surface 11, a pair of mating elements located on each of the sidewalls 12, 13, etc. Other arrangements of mating elements 51 are contemplated without departing from the scope of the present disclosure.

Inclusive Access Features

Embodiments of the play structure 10 may include at least one access platform 30 that is configured for a child with a disability, such as a child on a wheelchair or other mobility assistance device, to access the structure. An example of such a platform 30 is shown in FIG. 2. The platform 30 includes a substantially flat surface extending between a free distal end 31 and a proximal end 32, the distance between the distal end and the proximal end being sufficient for a child to comfortably access the structure 10 from a wheelchair. For instance, the distance between the distal end 31 and the proximal end 32 is at least 14 inches, alternatively at least 16 inches. The platform 30 also has a width that is sufficient for a child to comfortably access the structure 10 from a wheelchair. For instance, the platform 30 has a width of at least 24 inches, alternatively at least 26 inches. The platform 30 desirably has no sidewalls or other obstructions falling within the above-identified depth and width dimensions.

The platform 30 should also be positioned at a height that is configured to allow a child in a wheelchair to comfortably transfer from the wheelchair to the platform 30 and vice versa. For instance, the platform 30 may desirably be positioned at a height between about 11 inches and about 18 inches above the play surface. To facilitate children in mobility devices to access the climbing structure 10, the climbing structure is also desirably installed with an open access space that is sized and configured for one to transfer between a wheelchair and the platform 30. For instance, the access space may extend at least 30 inches from the distal end 31 of the platform 30. The access space may also desirably have a width that extends beyond the first and second sidewalls 12, 13. For instance, in some embodiments the open space may have a width of at least 48 inches.

The platform 30 may also comprise at least one transfer support, such as a transfer support handhold 33, at the distal end 31 of the platform. In some embodiments, such as the embodiment illustrated in FIG. 2, the distal end 31 of the platform may comprise a pair of transfer supports, such as a pair of transfer support handholds 33, one at each side of the platform 30. The one or more transfer support handholds 33 may comprise apertures in the surface of the platform (as illustrated in FIG. 2), indentations in the surface of the platform that are deep enough to provide a gripping surface, projections from the surface of the platform that provide a gripping surface, or a combination thereof. The one or more transfer support handholds 33 are positioned to assist a child in a wheelchair to transfer from the wheelchair onto the platform 30 and vice versa. For instance, a child may push a wheelchair right up to the distal end 31 of the platform and then use the one or more transfer support handholds 33 to pull his- or her-self off of the wheelchair and onto the platform 30.

In some embodiments, a platform 30 may be located at the first end 14 of the structure, at the second end 114 of the structure, or both. For instance, the climbing structure 10 illustrated in FIG. 2 has platforms 30 at the first end 14 and the second end 114 of the structure, which allows for a child with a disability to access the climbing structure 10 at the first end 14 (by transferring from a wheelchair to the platform 30), navigate the passageway, and exit the climbing structure at the second end 114 (by transferring from the platform 30 to the wheelchair).

In some embodiments, a side-access platform 30 may be located at a position between the first end 14 and the second end 114 of the structure 10. In this way, a child may access the passageway through a gap in one of the sidewalls 12, 13 of the structure 10. An example of a portion of a structure comprising a side-access platform 30 is shown in FIG. 7. As shown in FIG. 7, the platform 30 may extend outward from a gap in a sidewall 12, 13 of the structure 10. In some embodiments, the proximal end of the platform 32 may be substantially aligned with the interior surface of the sidewall from which it extends, such that the platform 30 does not substantially overlap with the lower surface 11 that extends along the length of the passageway. This may allow for a child to easily access the platform 30 without disrupting the flow of other children through the passageway. When a child accesses the passageway through a side-access platform 30, the passageway may extend in at least two directions—to the child's left and to the child's right. Thus, the child may choose one of at least two directions in which to navigate the structure 10. In some embodiments, the structure 10 may comprise at least one platform 30 at an end 14, 114 of the structure as well as at least one side-access platform 30 at a point between the ends.

Sensory Play Elements

In some embodiments, the lower surface 11 of the play structure 10 may comprise one or more floor insert play elements 25. For example, in some embodiments, a portion of the lower surface 11 may comprise an opening 24 into which a floor insert play element 25 may be inserted. An example of such an opening 24 is shown in FIG. 7. The opening 24 may extend all the way through the lower surface 11 or it may extend only partially into the lower surface (as illustrated in FIG. 7). A floor play element 25 may be inserted into the opening 24 and then affixed to the lower surface 11, such as through one or more conventional fasteners (e.g. bolts, screws, etc.). Multiple different floor play elements 25 may be dimensioned to fit within the opening 24, so that one could select from an array of different floor play elements for incorporation into the play structure 10.

Figure 8A:
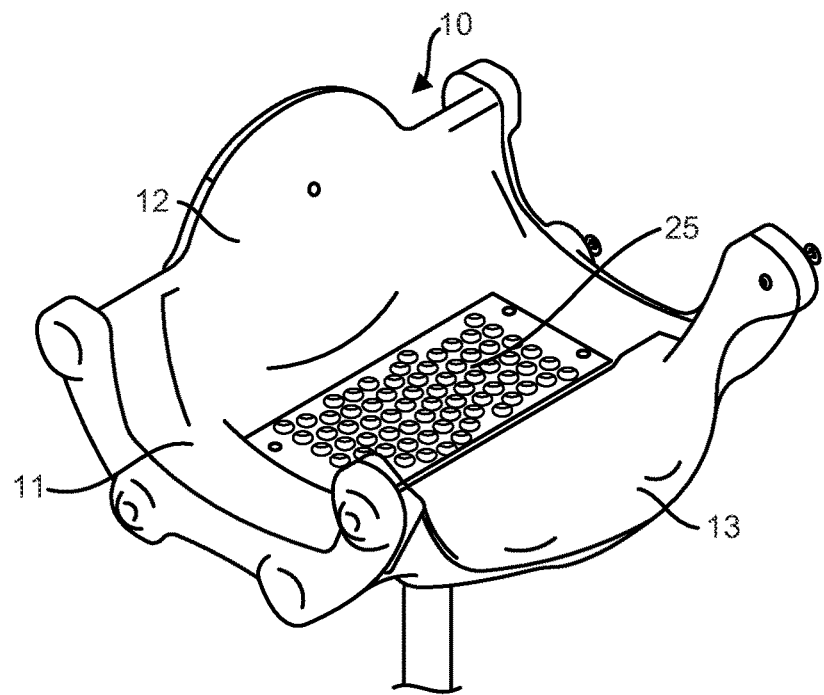
FIG. 8A is a perspective view of an embodiment of a straight component comprising a flat floor insert, such as may form a portion of the climbing structures of the present disclosure.
Figure 8B:
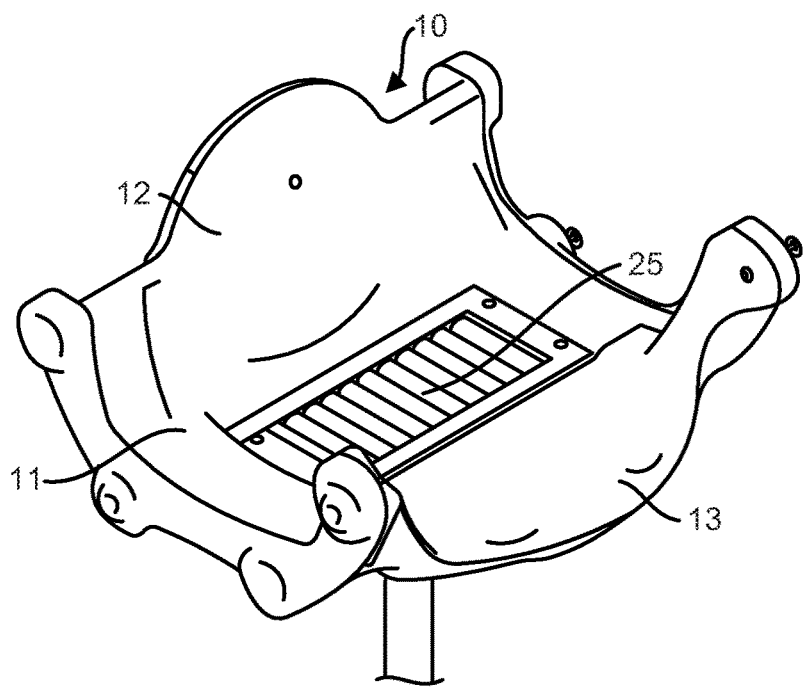
FIG. 8B is a perspective view of an embodiment of a straight component comprising a roller floor insert, such as may form a portion of the climbing structures of the present disclosure.

Examples of portions of a play structure 10 having play elements 25 inserted into a portion of the lower surface 11 are shown in FIGS. 8A and 8B. FIG. 8A shows a floor play element 25 that comprises an arrangement of apertures. Where the opening 24 extends all the way through the lower surface 11, this arrangement of apertures allows a child to see below the lower surface. FIG. 8B shows a floor play element 25 that comprises a series of rollers, which provide an interactive play opportunity. The elements shown in FIGS. 8A and 8B are only meant as examples. Other insertable floor play elements 25 are also contemplated; indeed the number of play opportunities that could be designed for incorporation into the play structure 10 of the present disclosure as floor inserts is almost limitless. In some embodiments, a substantially flat element that aligns with the surrounding lower surface 11 may be inserted into the opening 24, such as where no floor play element 25 is desired.

Embodiments of the playground structure 10 may also comprise one or more interactive play stations, such as play panels 100, on at least one of the sidewalls 12, 13. A playground climbing structure 10 comprising a plurality of interactive play stations, such as play panels 100 may provide a variety of play opportunities for children on the structure (e.g. within the passageway defined between the sidewalls 12, 13) and/or children located outside of the structure. For instance, the interactive play stations may be on the interior surface of at least one of the sidewalls 12, 13, on the exterior surface of at least one of the sidewalls, or a combination thereof.

The interactive play stations may comprise play panels 100, integral play stations 22, or a combination thereof. In some embodiments, for example, at least one of the sidewalls 12, 13 may comprise one or more integral play stations 22. Because of the relative limitations of being prepared (e.g. molded) integrally with the sidewall, the integral play stations 22 may typically provide tactile play opportunities. Nevertheless, integral play stations 22 may take on any number of configurations, including for example a maze that a child may navigate with his or her finger(s). An example of an integral tactile play station 22 is shown in FIG. 2.

Play panels 100 are play components that are attachable to (and removable from) the playground structure 10 of the present disclosure. Each play panel 100 comprises a surface 110 that is configured to provide one or more interactive play elements. In the illustrated embodiments, the play panels 100 comprise a circular, or round, surface 110. In other embodiments, however, the surface 110 may take on any other desired shape. For instance, in some embodiments, the surface 110 may be polygonal, rectangular, triangular, or the like. In some embodiments, the surface 110 may take on a novelty shape that may relate to a theme of the play panel 100 or the theme of the playground structure 10 to which it is attached.

Each play panel 100 may also comprise a mounting surface 120, which provides for attachment of the play panel to the climbing structure 10. In the illustrated embodiments, for example, the surface 110 comprising one or more interactive play elements is surrounded by a mounting surface 120, which runs along the periphery of the play panel 100. The mounting surface 120 is configured for mounting and affixing the play panel 100 to the climbing structure 10. This may be achieved in any of a number of conventional manners. In some embodiments, for example, the mounting surface 120 comprises a number of through-holes through which fasteners—such as bolts, screws, or the like—may be inserted to secure the play panel 100 to the climbing structure 10. The number of through-holes may vary depending on the size, shape, and/or weight of the play panel 100. The sidewalls 12, 13 of the climbing structure 10 may have a variety of corresponding and cooperative elements adapted to receive the fasteners and thereby affix the play panel 100 to the sidewall. These elements may be positioned at various positions along the sidewalls 12, 13 where the potential mounting of play panels 100 is envisioned. In some embodiments, for example, at least one of the sidewalls 12, 13 may comprise a surface 26 specifically configured for the mounting of a play panel 100.

Play panels 100 may be mounted on the interior of the climbing structure 10 sidewalls 12, 13; on the exterior of the climbing structure sidewalls; or both. In some embodiments, a play panel 100 may have multiple surfaces 110 that are configured to provide interactive play elements. For instance, some play panels 100 may be double-sided, with each of two opposing sides providing a surface 110 comprising one or more interactive play elements. A double-sided play panel 100 of this sort may be inserted into an aperture, or window 23, formed in one of the sidewalls 12, 13 of the climbing structure 10 so that a first surface 110 of the play panel 100 provides an interactive play element accessible by children on (e.g. within the passageway of) the climbing structure 10 while a second, opposing, surface 110 of the play panel 100 provides an interactive play element that is accessible by children outside of the climbing structure 10. In some embodiments, a double-sided play panel 100 may also simply be attached to the climbing structure 10 so as to cover an aperture, or window 23, formed in one of the sidewalls 12, 13 (rather than comprising a portion that is inserted into the aperture), so that a first surface 110 of the play panel 100 provides an interactive play element accessible by children on (e.g. within the passageway of) the climbing structure 10 while a second, opposing, surface 110 of the play panel 100 provides an interactive play element that is accessible by children outside of the climbing structure 10. In these embodiments, for example, a child may simply reach through the aperture in the sidewall 12, 13 of the climbing structure 10 to interact with the one or more play elements on the surface 110 of the play panel 100 adjacent to the aperture (as opposed to having those elements extend through the aperture).

In some embodiments, one or more interactive play elements on the surface 110 of a play panel 100 may be physically manipulated to provide a play activity. For instance, in some embodiments, surface 110 may be rotatable relative to the mounting surface 120, one portion of surface 110 may be rotatable relative to another portion of the surface, or one or more elements on surface 110 (e.g. wheels, balls, gears, rollers, etc.) may be rotatable. Rotation of the surface 110 or an element on the surface may result in visual feedback, auditory feedback, tactile feedback, or a combination thereof. The surface 11 of a play panel may also have one or more elements that are configured to be pressed, pulled, or otherwise physically moved by a child. For example, surface 110 may comprise physically manipulatable elements such as levers, knobs, switches, toggles, and combinations thereof. Physical manipulation of elements on the surface 110 of the play panel 100 may result in visual feedback, auditory feedback, tactile feedback, or a combination thereof.

Figure 9:
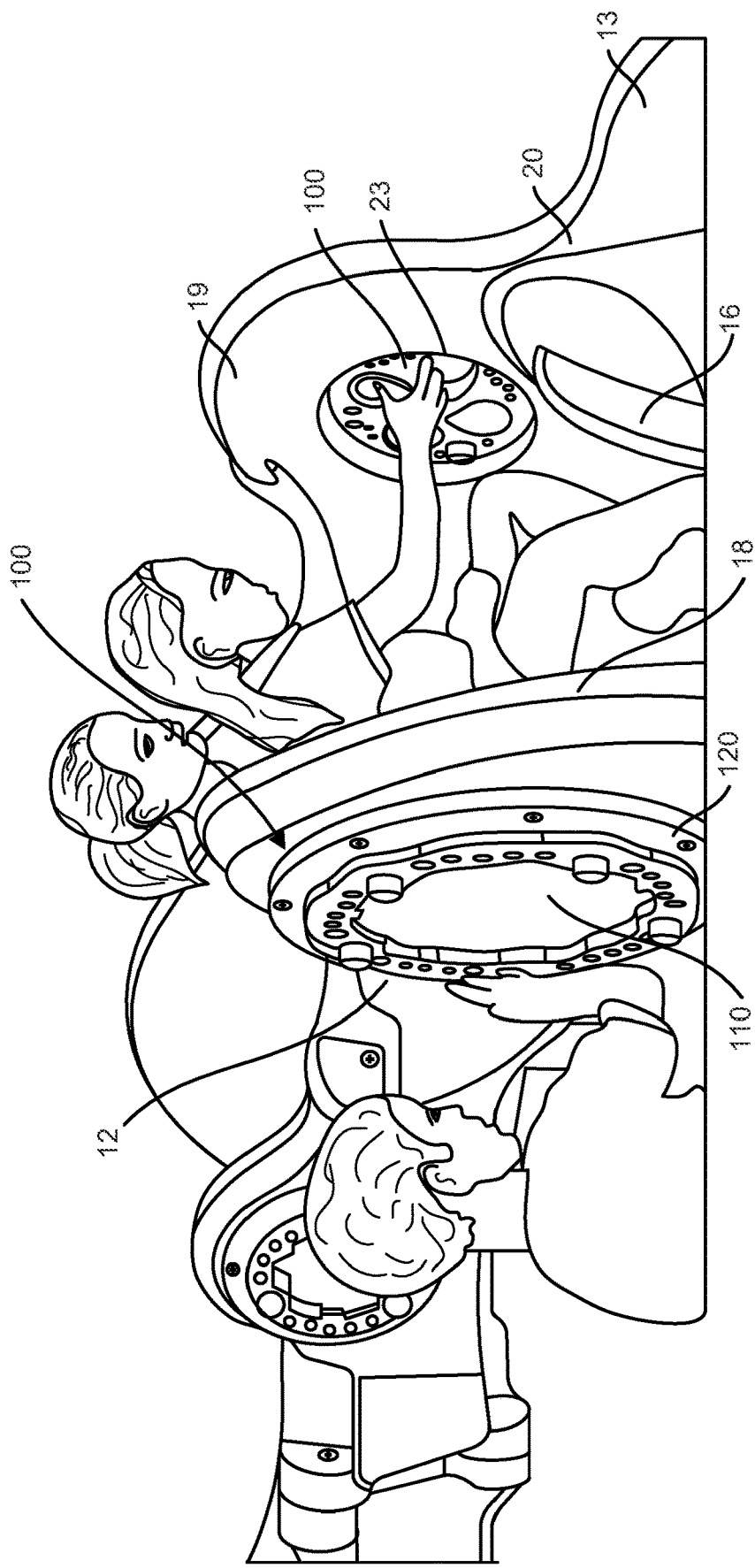
FIG. 9 is a perspective view of an embodiment of the climbing structures of the present disclosure, showing use by multiple children.

In some embodiments, the one or more interactive play elements on surface 110 of a play panel 100 may comprise an auditory play activity, such as one or more bells, chimes, noisemakers, musical instruments, or the like. For instance, the surface 110 of a play panel 100 may comprise a percussion instrument, such as one or more drums or keys (e.g. of a xylophone) that may be struck to make a sound. In some embodiments, the one or more interactive play elements on surface 110 of a play panel 100 may provide a visual play activity, such as one or more mirrored surfaces, prisms, kaleidoscopes, or the like. These auditory and visual play activities may be operated in conjunction with one or more physically manipulatable elements on surface 110. Examples of play panels 100 having physically manipulatable elements on surface 110 and which provide visual and tactile play activities are shown in FIG. 9.

Figure 11A:
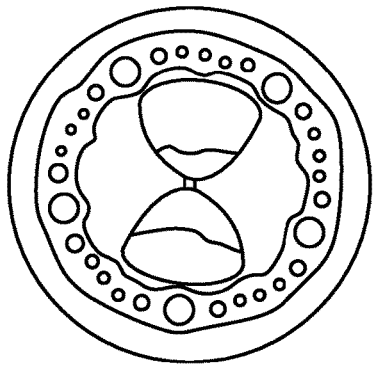
FIG. 11A is an illustration of a play panel of the sort that can be incorporated into embodiments of the climbing structures of the present disclosure.
Figure 11B:
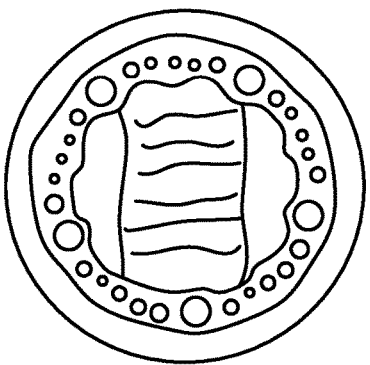
FIG. 11B is an illustration of a play panel of the sort that can be incorporated into embodiments of the climbing structures of the present disclosure.
Figure 11C:
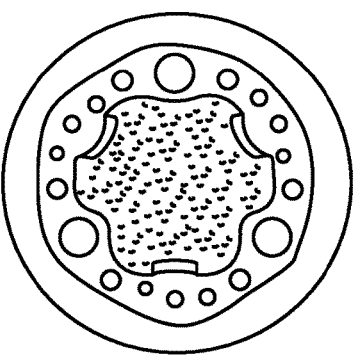
FIG. 11C is an illustration of a play panel of the sort that can be incorporated into embodiments of the climbing structures of the present disclosure.

Examples of play panels 100 that provide visual and/or tactile play activities are illustrated in FIGS. 11A through 11G. The play panel 100 of FIG. 11A comprises a visible enclosure containing sand or a product that looks and behaves like sand. Surface 110 or a portion of surface 110 comprising the visible enclosure is rotatable so as to cause the sand or sand-like product to flow from one portion of the enclosure to another. In particular, the sand enclosure in the play panel 100 shown of FIG. 11A is shaped as an hourglass, though other shapes and configurations are also contemplated. The play panel 100 of FIG. 11B comprises a visible enclosure containing water or other liquid. Surface 110 or a portion of surface 110 comprising the visible enclosure is rotatable so as to cause the water or other liquid to flow from one portion of the enclosure to another. In particular, the water enclosure in the play panel 100 shown of FIG. 11B is shaped as a waterfall, though other shapes and configurations are also contemplated. The play panel 100 of FIG. 11C comprises a visible enclosure containing one or more balls or marbles and a plurality of pegs that interrupt the movement of the one or more balls or marbles. Surface 110 or a portion of surface 110 comprising the visible enclosure is rotatable so as to cause the balls or marbles to travel from one portion of the enclosure to another, bouncing off of the pegs as in a pachinko machine.

Figure 11D:
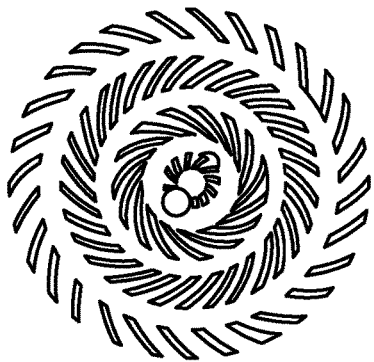
FIG. 11D is an illustration of a play panel of the sort that can be incorporated into embodiments of the climbing structures of the present disclosure.
Figure 11E:
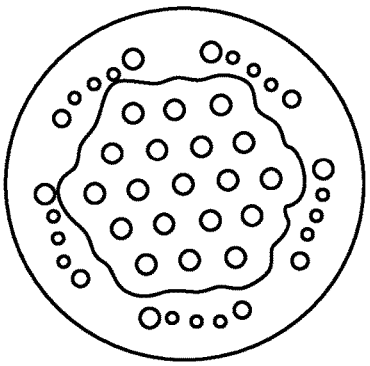
FIG. 11E is an illustration of a play panel of the sort that can be incorporated into embodiments of the climbing structures of the present disclosure.
Figure 11F:
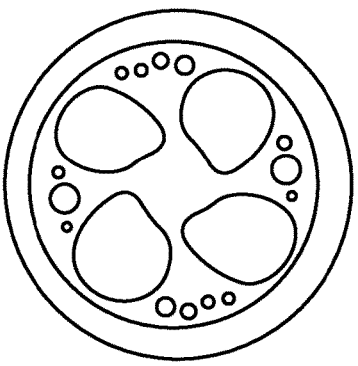
FIG. 11F is an illustration of a play panel of the sort that can be incorporated into embodiments of the climbing structures of the present disclosure.
Figure 11G:
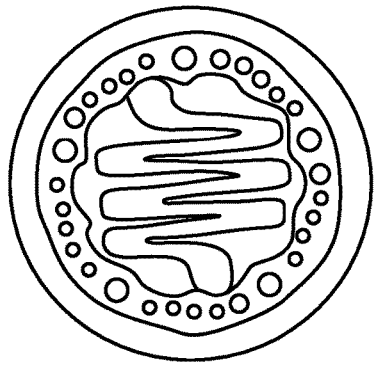
FIG. 11G is an illustration of a play panel of the sort that can be incorporated into embodiments of the climbing structures of the present disclosure.

The play panel 100 of FIG. 11D comprises a visible pattern on a surface 110 or a portion of surface 110 that is designed to produce a visual effect when the surface 110 or a portion of surface 110 is rotated. In particular the visual pattern on surface 110 of the play panel 100 in FIG. 11D is a spiral pattern that is designed to produce a three dimensional effect upon rotation. However, other patterns are also contemplated. The play panel 100 of FIG. 11E comprises a plurality of balls positioned within holders on surface 110. Each of the plurality of balls may each be rotated to produce a tactile play activity. The play panel 100 of FIG. 11F comprises a surface 110 having a plurality of openings through which an underlying surface is visible. The underlying surface comprises portions having different colors. Accordingly, by rotation of surface 110, the openings will align with the different-colored portions of the underlying surface to produce a visual color-wheel effect. Alternatively, the rotatable surface 110 may comprise different colored portions that produce a visual color-wheel effect when rotated. The play panel 100 of FIG. 11G comprises a visible enclosure containing one or more balls or marbles and one or more pathways that may be traversed by the one or more balls or marbles. Surface 110 or a portion of surface 110 comprising the visible enclosure is rotatable so as to cause the balls or marbles to travel within the one or more pathways. In particular, the enclosure in the play panel 100 shown of FIG. 11G provides a zig-zag pathway, though other shapes and configurations are also contemplated.

Figure 11H:
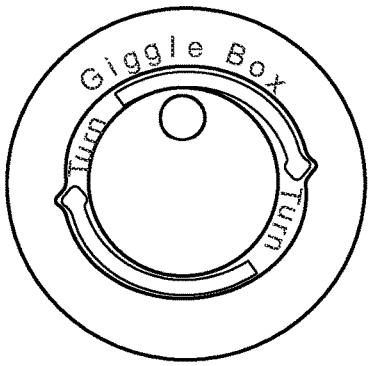
FIG. 11H is an illustration of a play panel of the sort that can be incorporated into embodiments of the climbing structures of the present disclosure.
Figure 11I:
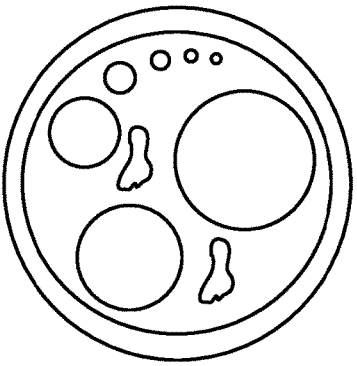
FIG. 11I is an illustration of a play panel of the sort that can be incorporated into embodiments of the climbing structures of the present disclosure.

Examples of play panels 100 that may be physically manipulated to provide an auditory play activity are illustrated in FIGS. 11H through 11I. The play panel of FIG. 11H provides a rotatable element on surface 110 that, when rotated, produces a funny noises or a noise simulating laughter. The play panel 100 of FIG. 11I comprises a plurality of bells on surface 110 and a plurality of striking elements that can be pulled and then released so as to strike at least one of the plurality of bells to produce a chime. Each bell may be configured to produce a chime having a particular note. The number and positioning of bells on surface 110 may be varied to provide a variety of play panels 100.

Each of the play panels 100 shown in FIG. 11 are provided merely as examples of play panels that may be incorporated into the climbing structure 10 of the present disclosure. It is contemplated that new types of play panels 100 will continue to be developed and incorporated into climbing structures 10 in order to provide an evolving sensory play structure.

In some embodiments, the play panel 100 may also comprise an electronic control unit 140 and the one or more interactive play elements on surface 110 of the play panel 100 may be configured to be operated by the electronic control unit. The electronic control unit 140 may also be referred to as a processing unit or a processor. The electronic control unit 140 may comprise a conventional printed circuit board (PCB) that is configured to receive an input signal from one or more sources and convert that input signal into one or more output signals. The electronic control unit 140 is desirably protected from the playground environment. For instance, the electronic control unit 140 may preferably be located behind the surface 110 comprising the play activity, such that it is not visible to children when interacting with the play panel 100. The electronic control unit 140 may, for example, be positioned within an interior of the play panel 100, e.g. between the front and rear surfaces of the play panel. In some embodiments, such as where a play panel 100 may have multiple surfaces 110 that are configured to provide play activities as described above, a single electronic control unit 140 may be configured to operate the multiple play activities. This may reduce the costs associated with each play activity. Alternatively, each play activity may be operated by its own electronic control unit 140. The play panel 100 may also comprise a power source for the electronic control unit 140, such as one or more battery packs.

Depending on the type of play activity (or activities) provided by the play panel 100, the play panel may comprise a number of output components that may be linked with the control unit 140. In some embodiments, for example, the play panel 100 may comprise one or more speakers. In some embodiments, the play panel 10 may comprise one or more lights on, or attached to, the surface 110 of the play panel. In some embodiments, the play panel 10 may comprise one or more motors that are configured to manipulate one or more physical elements on the surface 100 of the play panel. In some embodiments, the play panel 100 may comprise one or more video screens on, or attached to, the surface 110 of the play panel. Embodiments of the play panel 100 may also comprise any combination of control unit output components, such as combinations of speakers, lights, motors, and video screens.

The control unit 140 may be activated through the interaction of a child with one or more interactive elements on the surface 110 of the panel. For example, interaction with an element on the surface 110 of the panel may cause an input signal to be conveyed to the control unit 140. The control unit 140 may process that input signal and send an output signal to one or more output components such as a speaker, a light, a motor, a video screen, or the like. For instance, a child may touch any of a number of touch sensors (e.g. buttons) on the surface 110 of the play panel, activate any of a number of motion sensors on the surface 110 of the play panel, physically manipulate any of a number of elements on the surface 110 of the play panel, or the like. Interaction with an element on the surface 110 of the panel may thereby cause an input signal to be sent to the control unit 140. The control unit 140 may process the input signal, including for instance converting it into an output signal. The control unit 140 may then convey the output signal to the output component, which may produce visual feedback, auditory feedback, tactile feedback, or a combination thereof.

Figure 10:
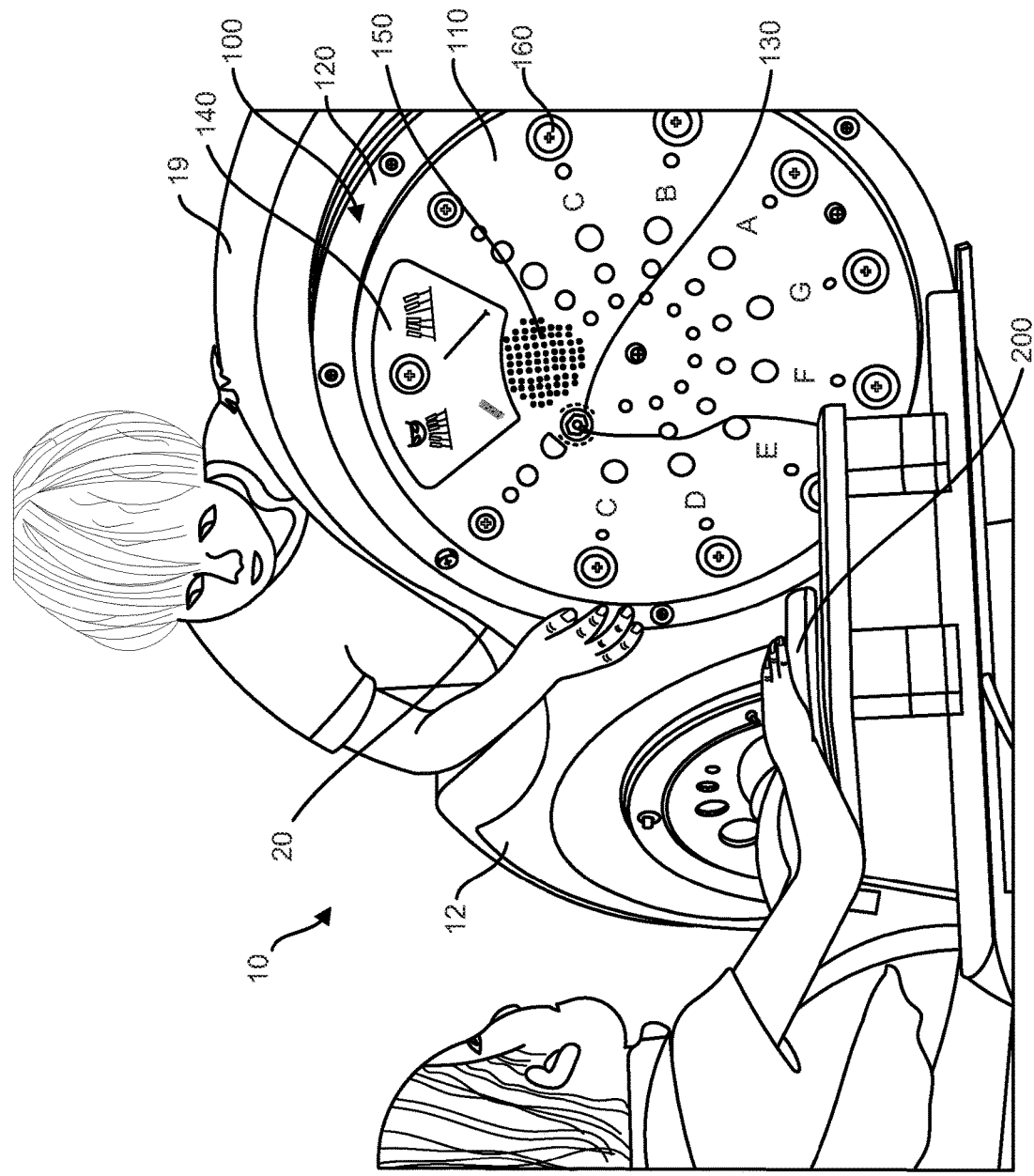
FIG. 10 is a perspective view of an embodiment of the climbing structures of the present disclosure, showing cooperative use of an interactive play panel by a child on the climbing structure and a child outside of the climbing structure.

For instance, the embodiment shown in FIG. 10, a child may touch any of a number of sensors that are configured to detect a person's touch, in this case buttons 160, located on the surface 110 of the play panel 100. The pressing of one of the buttons 160 sends an input signal to the control unit 140, which then processes that input signal and sends an output signal to a speaker 150, the output signal corresponding with a musical note (or a series of musical notes). By pressing the buttons 160 in a series, a child may thereby cause a song or a portion of a song to play over the speaker 150. While the illustrated embodiment shows buttons 160, other interactive elements are also contemplated.

Although not illustrated, in some embodiments, the play panel 100 may comprise one or more lights on the play surface 110. The play panel 100 may be configured so that a child may touch one or more interactive elements, e.g. touch sensors such as buttons or the like, on the surface 110 of the play panel 100 in order to trigger the control unit 140 to illuminate the one or more lights. In some embodiments, the play panel 100 may comprise one or more elements that are movable about the surface 110 of the play panel. The play panel 100 may be configured so that a child may (i) physically manipulate the element(s) and/or (ii) touch one or more interactive elements, e.g. touch sensors such as buttons or the like, on the surface 110 of the play panel in order to trigger the control unit 140 to initiate a motor that manipulates the element(s). Moreover, in some embodiments, the play panel 100 may comprise one or more video screens on the surface 110 of the play panel. The play panel 100 may be configured so that a child may touch one or more interactive elements, e.g. touch sensors or a touchscreen, on the surface 110 of the play panel in order to trigger the control unit 140 to play content on the video screen, alter/change the content being played on the video screen, or the like.

In some embodiments, one or more of the play panels 100 may also be operated through the interaction of a child with an adaptive switch 200. For instance, an adaptive switch 200 may be connected to the play panel 100, such as through the adaptive switch port 130 on the play panel. Once the adaptive switch 200 is connected to the play panel 100, the play panel may be operated through the interaction of a child, e.g. a child with a disability, with the adaptive switch. For example, activation of the adaptive switch 200 may cause an input signal to be sent to the control unit 140. The control unit 140 may process that input signal and send an output signal to one or more play element such as a speaker, a light, a motor, a video screen, or the like. In some embodiments, the control unit 140 may recognize the input as being sent by an adaptive switch 200 and may present a different output signal based on that recognition. For instance, in the embodiment shown in FIG. 10, activation of the adaptive switch 200 may send a signal to the control unit 140, which then processes that input signal and sends an output signal to the speaker 150. However, rather than emitting a single musical note, as is the case when a child interacts directly with the surface 110 of the play panel 100, the output signal may cause the speaker 150 to emit a song or a portion of a song. In this way, one or more play panels 100 may be designed to provide play opportunities to children with disabilities as well as children without disabilities. Additional description of play panels 100 configured for operation with adaptive switches 200 may be found in U.S. patent application Ser. No. 15/691,212, the entirety of which is incorporated by reference herein.

Figure 11K:
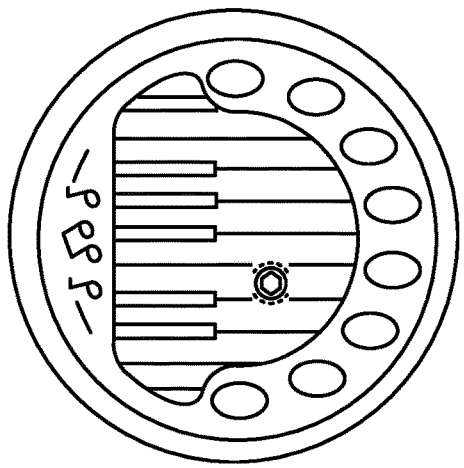
FIG. 11K is an illustration of a play panel of the sort that can be incorporated into embodiments of the climbing structures of the present disclosure.
Figure 11L:
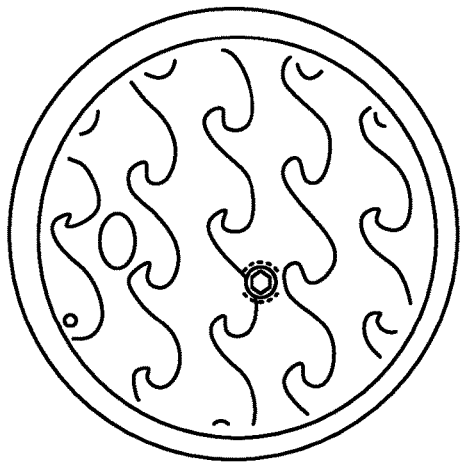
FIG. 11L is an illustration of a play panel of the sort that can be incorporated into embodiments of the climbing structures of the present disclosure.
Figure 11J:
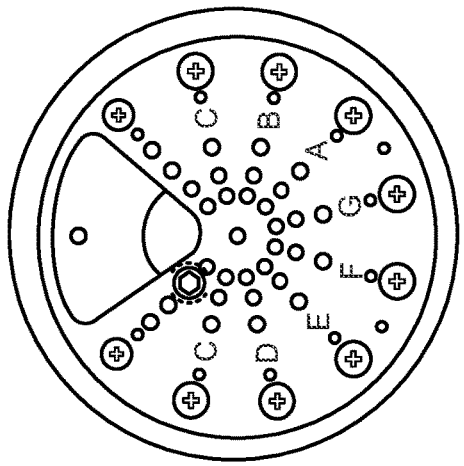
FIG. 11J is an illustration of a play panel of the sort that can be incorporated into embodiments of the climbing structures of the present disclosure.

Examples of play panels 100 that utilize a control panel 140 to provide an auditory play activity are illustrated in FIGS. 11J through 11L. The play panel 100 of FIG. 11J is substantially identical to play panel 100 shown in FIG. 10 and described above. The play panel 100 of FIG. 11K comprises a plurality of touch sensors on surface 110, each of which corresponds with a key of a piano. A child may press the touch sensors in any sequence in order to play a song or a portion of a song from an integrated speaker. In some embodiments, the play panel 100 shown in FIG. 11K may also be operated with an adaptive switch 200 in order to produce a song or a portion of a song. The play panel 100 of FIG. 11L comprises at least one touch sensor which, when operated, produces the sound of waves at a seashore. In some embodiments, the play panel 100 shown in FIG. 11L may also be operated with an adaptive switch 200 in order to produce the sound of waves at a seashore.

Each of the play panels 100 shown in FIG. 11 are provided merely as examples of play panels that may be incorporated into the climbing structure 10 of the present disclosure. It is contemplated that new types of play panels 100 will continue to be developed and incorporated into climbing structures 10 in order to provide an evolving sensory play structure.

It can be seen that the described embodiments provide a unique and novel playground structure that has a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A playground climber unit comprising:
    a first end and a second end;
    a first sidewall and a second sidewall; and
    a lower surface between the first and second sidewalls, the first and second sidewalls being spaced apart from one another such that a child may move along the lower surface between the first and second sidewalls; wherein at least one of the first end and the second end comprises a wheelchair transfer platform configured for a child on a wheelchair to access the climber unit, the wheelchair transfer platform comprising:
    a proximal end and a free distal end;
    a substantially flat surface extending between the distal end and the proximal end, the distance between the distal end and the proximal end being at least fourteen inches, and
    at least one transfer support handhold positioned on the substantially flat surface at the distal end.

2. The playground climber unit of claim 1, wherein the platform is at a height between about eleven and eighteen inches above a play surface.

3. The playground climber unit of claim 1, wherein at least the distal end of the platform has no sidewalls.

4. The playground climber unit of claim 3, wherein the first and second sidewalls curve downward toward the distal end of the platform.

5. The playground climber unit of claim 1, wherein the at least one transfer support handhold comprises an aperture in the substantially flat surface.

6. The playground climber unit of claim 1, wherein the first end comprises the wheelchair transfer platform and the second end is connected to the deck of a composite playground system.

7. The playground climber unit of claim 6, wherein the second end comprises a deck coupler component.

8. The playground climber unit of claim 1, wherein each of the first and second ends comprises a wheelchair transfer platform.

9. The playground climber unit of claim 1, further comprising, between the first and second ends, a side-access platform.

10. The playground climber unit of claim 9, wherein the side-access platform is configured for a child on a wheelchair to access the climber unit.

11. The playground climber unit of claim 1, further comprising, between the first and second ends, a floor play element inserted into the lower surface.

12. The playground climber unit of claim 1, wherein the climber unit comprises a plurality of independent components and wherein the climber unit comprises, between the first and second ends, at least one of a curve component and a straight component.

13. The playground climber unit of claim 1, wherein the climber unit comprises a plurality of independent components, and
    wherein the components are connected together so that the lower surface is substantially continuous between the first end and the second end.

14. The climber unit of claim 13, wherein the components comprise at least two of the following:
    an arch component,
    an end transfer platform component,
    a straight component,
    a curve component, and
    a deck coupler component.

15. The climber unit of claim 13, wherein each component comprises a plurality of mating elements on at least one end, the plurality of mating elements being configured to connect with a plurality of mating elements on each of the other components.

16. The climber unit of claim 15, wherein each plurality of mating elements comprises at least one male connection element and at least one female connection element.

17. The climber unit of claim 15, wherein each component further comprises at least one through-hole configured to accommodate a fastener to secure the component to an adjacent, connected component.

18. The climber unit of claim 1, further comprising at least one play panel attached to at least one of the sidewalls.

* * * * *